(12) United States Patent
Fife et al.

(10) Patent No.: US 7,960,863 B2
(45) Date of Patent: Jun. 14, 2011

(54) SYSTEM AND METHOD OF DETERMINING MAXIMUM POWER POINT TRACKING FOR A SOLAR POWER INVERTER

(75) Inventors: John M. Fife, Bend, OR (US); Michael A. Mills-Price, Bend, OR (US); Steven G. Hummel, Bend, OR (US)

(73) Assignee: PV Powered, Inc., Bend, OR (US)

( * ) Notice: Subject to any disclaimer, the term of this patent is extended or adjusted under 35 U.S.C. 154(b) by 0 days.

(21) Appl. No.: 12/616,763

(22) Filed: Nov. 11, 2009

(65) Prior Publication Data

US 2010/0117623 A1    May 13, 2010

Related U.S. Application Data

(60) Provisional application No. 61/113,555, filed on Nov. 11, 2008.

(51) Int. Cl.
*H02J 1/00* (2006.01)
(52) U.S. Cl. .......................... 307/75; 323/906; 136/206
(58) Field of Classification Search ................. 323/906, 323/284; 307/51, 44, 43, 75; 703/18; 700/299; 136/206
See application file for complete search history.

(56) References Cited

U.S. PATENT DOCUMENTS

| | | | |
|---|---|---|---|
| 5,923,100 A * | 7/1999 | Lukens et al. | 307/66 |
| 7,042,195 B2 | 5/2006 | Tsunetsugu et al. | |
| 7,193,872 B2 | 3/2007 | Siri | |
| 7,324,361 B2 | 1/2008 | Siri | |
| 2008/0036440 A1 | 2/2008 | Garmer | |

FOREIGN PATENT DOCUMENTS

WO    WO-2008000282 A1    1/2008

OTHER PUBLICATIONS

International Search Report and Written Opinion for International Application No. PCT/US2009/064074, Mail Date Feb. 3, 2010, 8 pages.
Esram et al., "Comparison of Photovoltaic Array Maximum Power Point Tracking Techniques," IEEE Transactions on Energy Conversion, vol. 22, No. 2, Jun. 2007, 11 pages.
Esram et al., "Dynamic Maximum Power Point Tracking of Photovoltaic Arrays Using Ripple Correlation Control," IEEE Transactions on Power Electronics, vol. 21, No. 5, Sep. 2006, 10 pages.
Femia et al., "Optimization of Perturb and Observe Maximum Power Point Tracking Method," IEEE Transactions on Power Electronics, vol. 20, No. 4, Jul. 2005, 11 pages.

(Continued)

*Primary Examiner* — Shawn Riley
(74) *Attorney, Agent, or Firm* — Perkins Coie LLP

(57) ABSTRACT

A system and method for operating a photovoltaic element at or near a maximum power point. A maximum power point tracker changes a voltage or current set point of a photovoltaic element in sequential discrete steps, measuring an output power at each step after a predetermined settling time. A slope of a power-voltage curve is then estimated and the slope is corrected for irradiance changes. Finally, an operating voltage or current of the photovoltaic element is adjusted based on the slope of the power-voltage curve and other factors, causing the photovoltaic element to operate at or near its maximum power.

34 Claims, 3 Drawing Sheets

OTHER PUBLICATIONS

Hua et al., "Implementation of a DSP-Controlled Photovoltaic System with Peak Power Tracking," IEEE Transactions on Industrial Electronics, vol. 45, No. 1, Feb. 1998, 9 pages.

Jain et al., "A New Algorithm for Rapid Tracking of Approximate Maximum Power Point in Photovoltaic Systems," IEEE Power Electronics Letters, vol. 2, No. 1, Mar. 2004, 4 pages.

Leyva et al., "MPPT of Photovoltaic Systems using Extremum-Seeking Control," IEEE Transactions on Aerospace and Electronic Systems, vol. 42, No. 1, Jan. 2006, 10 pages.

Masoum et al., "Theoretical and Experimental Analyses of Photovoltaic Systems with Voltage- and Current-Based Maximum Power-Point Tracking," IEEE Transactions on Energy Conversion, vol. 17, No. 4, Dec. 2002, 9 pages.

Mutoh et al., "A Method for MPPT Control While Searching for Parameters Corresponding to Weather Conditions for PV Generation Systems," IEEE Transactions on Industrial Electronics, vol. 53, No. 4, Aug. 2006, 11 pages.

Veerachary et al., "Feedforward Maximum Power Point Tracking of PV Systems Using Fuzzy Controller," IEEE Transactions on Aerospace and Electronic Systems, vol. 38, No. 3, Jul. 2002, 13 pages.

Xiao et al., "Real-Time Identification of Optimal Operating Points in Photovoltaic Power Systems," IEEE Transactions on Industrial Electronics, vol. 53, No. 4, Aug. 2006, 10 pages.

* cited by examiner

SYSTEM AND METHOD OF DETERMINING MAXIMUM POWER POINT TRACKING FOR A SOLAR POWER INVERTER

CROSS-REFERENCE TO RELATED APPLICATION(S)

This application claims the benefit of U.S. Provisional Patent Application No. 61/113,555, filed on Nov. 11, 2008, and which is incorporated herein by reference.

TECHNICAL FIELD

The present disclosure is directed to system and methods of determining the maximum power point for solar power systems.

BACKGROUND

Solar power has become an increasingly important energy source for the world. But like many other forms of energy, electricity produced by photovoltaic power systems is a scarce and valuable resource. Although solar power is renewable and pollution free, fixed costs associated with generating solar power are high. To provide more of a scarce resource and to offset these high fixed costs, a solar power system should operate to maximize its power output when possible.

Photovoltaic power systems generate power by converting solar energy into electricity. Solar panels containing photovoltaic cells are typically arranged in an array and constructed at a location that receives plentiful sunshine. Photons from the sun create a voltage in the photovoltaic cells, which produce a direct current when connected to a load. Oftentimes, the direct current is converted into an alternating current so that the solar array may provide electricity to a power grid.

A solar array generates maximum power when its photovoltaic cells operate where $dI/dV=-I/V$, which occurs when the instantaneous slope of the array's power-voltage curve is equal to zero. This maximum power point may vary with solar irradiance and other factors, such as ambient temperature. Maximum power point tracking (MPPT) methods attempt to determine this ideal operating point and adjust how the solar array operates so that the photovoltaic cells take full advantage of available solar energy.

The most widely adopted MPPT methods track a solar array's power-maximizing point reasonably well when solar irradiance and ambient temperature do not vary quickly with time. However, these methods have considerable drawbacks, including relatively poor performance under dynamic conditions. One existing MPPT method is the perturb and observe method, in which the operating voltage or current of an array is adjusted and the power output is observed to determine whether the change results in more power. Although the perturb and observe method may operate the solar array near its maximum power point when irradiance is constant, the solar array's operating power generally oscillates around the maximum power point as the solar array's operating voltage or current is periodically perturbed to determine whether another point maximizes power output. Additionally, during rapidly varying irradiance levels, this method may react too slowly to successfully determine the maximum power point and may even track in the wrong direction.

Another existing MPPT method is the incremental conductance method in which a solar array's power-voltage curve is observed and a maximum power point is found by comparing the solar array's instantaneous conductance ($I/V$) with an incremental conductance ($dI/dV$). If the solar array experiences a change in current, its operating voltage is adjusted until $dI/dV=-I/V$ once again. The incremental conductance method improves upon the perturb and observe method in that it does not oscillate around the maximum power point during steady-state operation. However, measuring incremental conductance takes a finite amount of time, during which changes in irradiance may cause the solar array to operate below its maximum power point. As with the perturb and observe method and other MPPT methods, the incremental conductance method does not optimize a solar array's power output when it is unable to accurately track the solar array's maximum power point.

DETAILED DESCRIPTION

A. Overview

Figure 1:
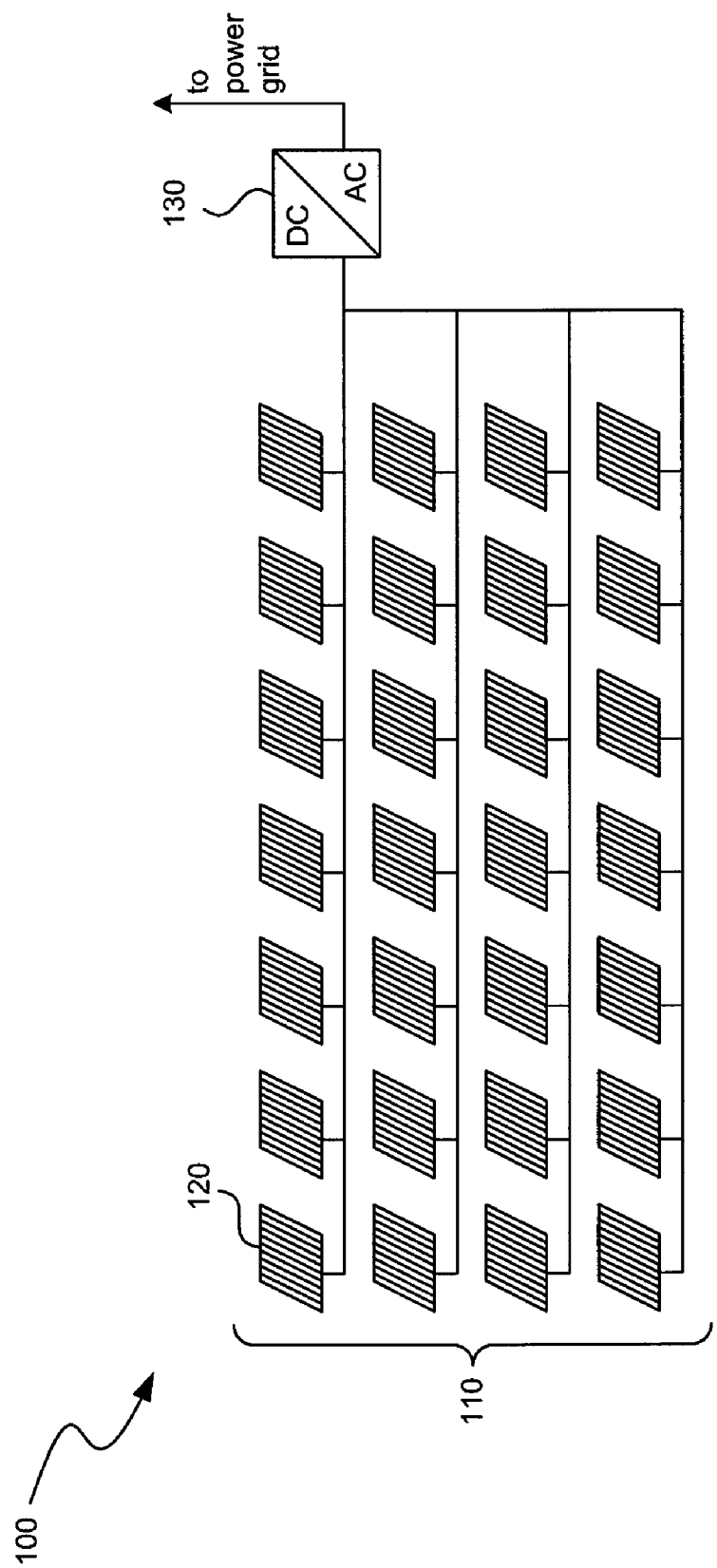
FIG. 1 is a diagram of a representative system for generating solar power in accordance with an embodiment of the technology.

A system and method are described for operating a photovoltaic (PV) element, such as a solar array, solar panel, or portion thereof, at or near its maximum power point under both static and dynamic conditions. In some embodiments, a maximum power point tracker changes a voltage or current set point of a solar array in sequential discrete steps and measures an output power at each step after a predetermined settling time. A slope of a power-voltage curve is then estimated and the slope is corrected for irradiance changes. Finally, an operating voltage of the solar array is adjusted based on the slope of the power-voltage curve and other factors, such that the solar array operates at or near its maximum power output.

In some embodiments, a maximum power point tracker measures a first power of a solar array at a first voltage, measures a second power of the solar array at a second voltage that is lower than the first voltage, measures a third power of the solar array at the first voltage once again, measures a fourth power of the solar array at a third voltage that is higher than the first voltage, and measures a fifth power of the solar array at the first voltage. The maximum power point tracker may measure the first power, the second power, the third power, the fourth power, and the fifth power at various time intervals so that the third power is measured at a time that is central difference from the time that the first power and the fifth power are measured and from the time that the second power and the fourth power are measured.

Using these first through fifth power measurements, the maximum power point tracker calculates an irradiance-rate-corrected slope of a power-voltage curve associated with the solar array. An operating voltage of the solar array is adjusted as a function of the irradiance-rate-corrected slope of the power-voltage curve. Adjusting the operating voltage of the solar array alters the solar array's operating current so that the solar array operates at or near its maximum power point. In some embodiments, the solar array operates at its maximum power point by adjusting an impedance of the solar array. In other embodiments, the solar array operates at its maximum power point by adjusting an operating current of the solar array. In some embodiments, the operating voltage of the solar array is adjusted based on a change in irradiance between when the first power of the solar array is measured and the fifth power of the solar array is measured.

In some embodiments, the difference between the first voltage and the second and third voltages is a function of at least one of power, voltage, irradiance, temperature, environment data, and other parameters, conditions, or the like. Similarly, in some embodiments, the operating voltage of the solar array is a function of the irradiance-rate-corrected slope of the power-voltage curve and at least one of power, voltage, irradiance, temperature, environment data, or other parameters, conditions, or the like.

The system and method will now be described with respect to various embodiments. The following description provides specific details for a thorough understanding of, and enabling description for, these embodiments of the system and method. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below, however, any terminology intended to be interpreted in any restricted manner will be overtly and specifically defined as such in this Detailed Description section.

B. Embodiments of Maximum Power Point Trackers and Associated Methods

FIG. 1 is a diagram of a representative system 100 for generating solar power, in which a maximum power point tracker according to the present technology operates. A solar array 110 consists of multiple solar panels 120 containing multiple solar cells. The solar cells convert solar energy into a voltage that creates direct current electricity when connected with a load. The solar array 110 and the solar cells composing the solar array may be of any type, including crystalline, polycrystalline, amorphous, and thin-film.

An inverter 130 connects the solar array 110 with a power grid. The inverter 130 converts direct current from the solar cells into alternating current suitable for the power grid. The inverter 130 may also control the operating power of the solar array 110 by adjusting an impedance to regulate the solar array's operating voltage or current. One skilled in the art will appreciate that an inverter may control the operating power of a very large solar array consisting of many solar panels, or the inverter may control the operating power of a single solar panel or a portion thereof. However, as explained below, a component other than an inverter may control the operating power of the solar array 110. For example, a component may be deployed on each solar panel 120 to independently control the operating voltage or current from individual solar panels. Thus, as described herein, a maximum power point tracker may act independently from an inverter to control the operating voltage or current of a solar panel or solar array. Moreover, although some embodiments are described with respect to controlling an operating voltage or current of a solar array, one skilled in the art will appreciate that a maximum power point tracker may just as well control an operating voltage or current of an individual solar panel, or a portion thereof.

Figure 2:
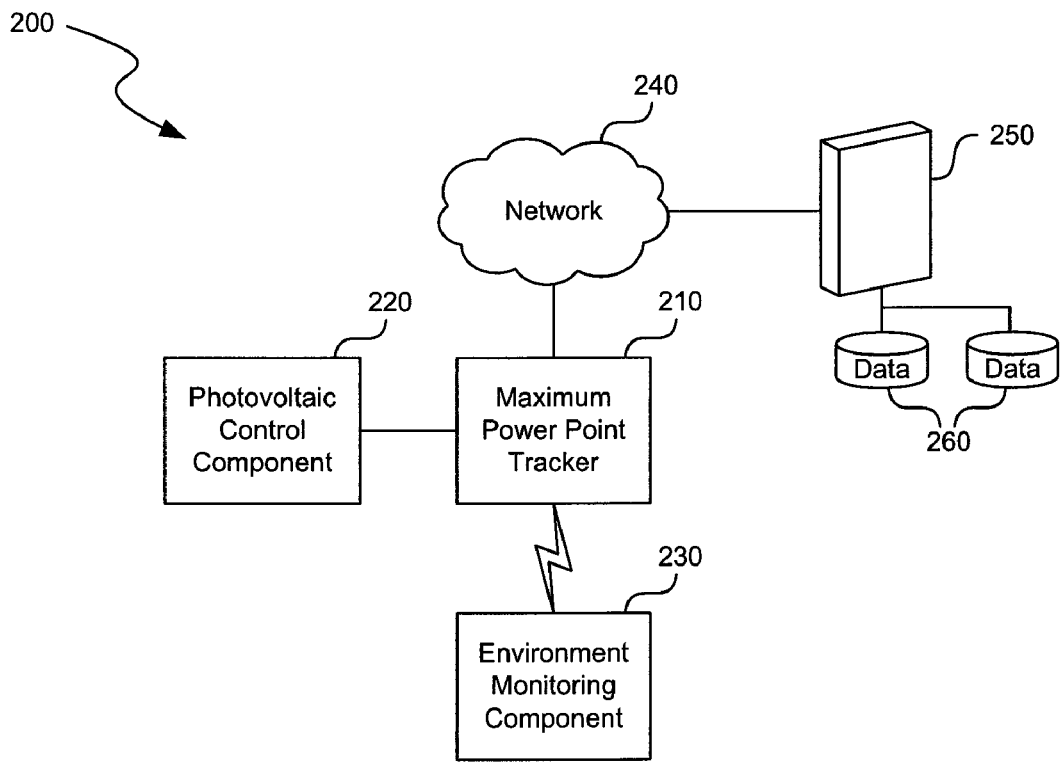
FIG. 2 is a block diagram of a system for operating a photovoltaic element at or near its maximum power point in accordance with an embodiment of the technology.

FIG. 2 is a block diagram of a system 200 for tracking a maximum power point of a PV element. A maximum power point tracker 210 determines an operating voltage and/or current for the PV element that will cause the PV element to operate at or near its maximum power point. The maximum power point tracker 210 includes a memory and at least one processor, such as an imbedded digital signal processor (DSP), a microcontroller, a general purpose processor, or the like. The maximum power point tracker 210 measures the power from the PV element, such as one or more solar panels or arrays, and calculates an operating voltage or current of the PV element to maximize the power output.

A photovoltaic control component 220 is connected with the maximum power point tracker 210 and may control an operating voltage or current of the PV element. The photovoltaic control component 220, for example, may control an impedance that may be adjusted to maximize the output power of the PV element. The photovoltaic control component 220 may include semiconductor switches and/or other circuitry that may be adjusted to impede an output current of the PV element.

In one embodiment, the photovoltaic control component 220 is an inverter. One skilled in the art will appreciate that a maximum power point tracker 210 may be (a) centralized in an inverter, (b) distributed between the inverter and another system component, and/or (c) centralized in a system component external to the inverter or distributed between multiple external system components or another system.

The maximum power point tracker 210 may include one or more communication components used for wired or wireless communication protocols, such as GSM, CDMA, GPRS, EDGE, UMTS, IEEE-1284, IEEE 802.11, IEEE 802.16, etc. The maximum power point tracker 210 may communicate with a server 250 or other computing devices via a public and/or private network 240. The server 250 may access data storage areas 260 to obtain or store data. The maximum power point tracker 210 may receive environment or weather data from the server 250 or from other computing devices via the public and/or private network.

An environment monitoring component 230 provides environment data to the maximum power point tracker 210. The environment monitoring component may include one or more communication components used for wired or wireless communication, such as GSM, CDMA, IEEE-1284, IEEE 802.11, etc. The environment monitoring component may communicate directly with the maximum power point tracker 210 via radio signals or a wired connection, or it may communicate through a mobile telecommunications network or other wireless telecommunications network or wireless local area network (WLAN). The environment monitoring component 230 may include a thermometer, a wind gauge, a barometer, a radar system, a satellite imagery system, a camera, an irradiance sensor, or any other device or system that can provide environmental data to the maximum power point tracker.

In some embodiments, the maximum power point tracker 210 is configured to process data or signals from the environment monitoring component 230. For example, in some embodiments, the environment monitoring component may include a video camera that captures images of the sky. The maximum power point tracker may receive encoded video data from the video camera and process the video data to determine, for example, a cloud density of the sky or irradiance on the PV element.

Figure 3:
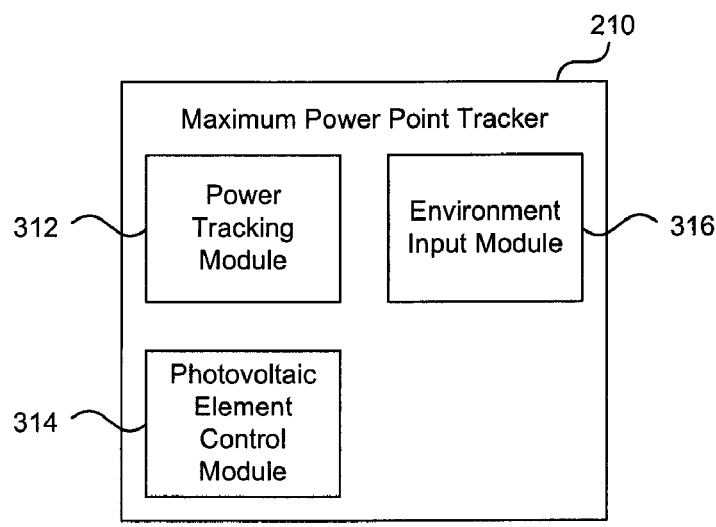
FIG. 3 is a block diagram of functional components of a system for operating a photovoltaic element at or near its maximum power point in accordance with an embodiment of the technology.

FIG. 3 is a block diagram of the maximum power point tracker 210 that tracks a maximum power point of a PV element. The maximum power point tracker 210 includes a power tracking module 312, a PV element control module 314, and, in some embodiments, an environment input module 316. The power tracking module 312 measures the operating power, voltage, and/or current of the PV element. The power tracking module 312 uses this data, and in some embodiments, data from the environment input module 316, to calculate an operating voltage or current for the PV element so that the PV element operates at or near a maximum power point.

The photovoltaic element control module 314 generates control signals to control an operating voltage or current of the PV element. The control signals may instruct an inverter or another component to increase or decrease an impedance, which may alter the operating voltage or current of the PV element.

The environment input module 316 calculates how environmental conditions associated with the PV element affect the maximum power point of the PV element. The environment input module 316 may monitor environmental conditions by analyzing images and video of an environment of the PV element. It may also analyze satellite and radar images and video, wind speed, barometric pressure, temperature, longitude and latitude coordinates of the PV element, time of day or year, and the like. The power tracking module 312 may use environmental data produced by the environment input module 316 to track the PV element's maximum power point, as explained in more detail below with reference to FIG. 4.

Figure 4:
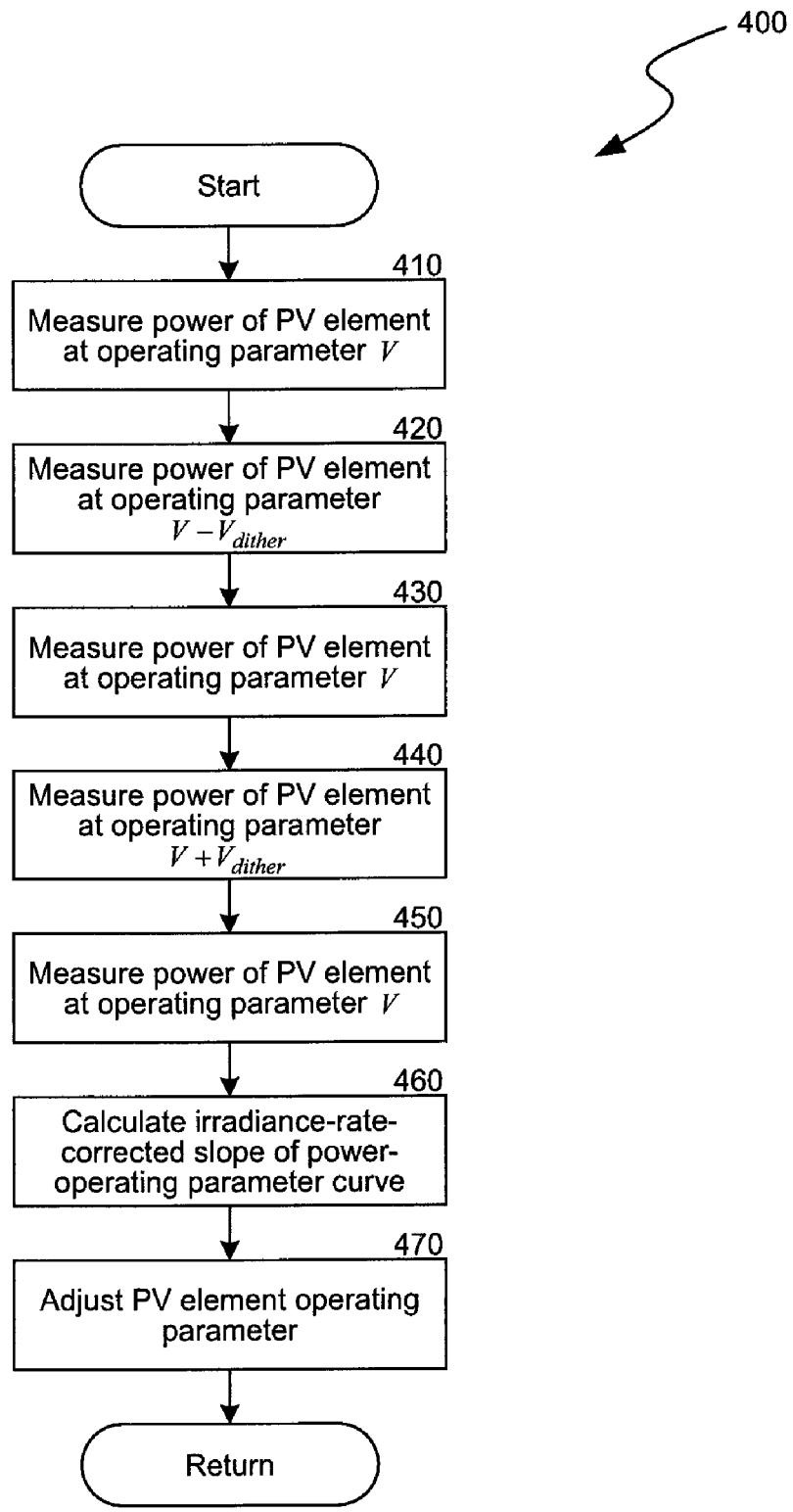
FIG. 4 is a flow diagram illustrating a method performed by a system for operating a photovoltaic element at or near its maximum power point in accordance with an embodiment of the technology.

FIG. 4 is a flow diagram of a process 400 implemented by a maximum power point tracker to operate a PV element at or near a maximum power point. In some embodiments, the process 400 is repeated continuously to track the maximum power of the PV element over time. In other embodiments, the process 400 is repeated less frequently. The frequency by which the process 400 is repeated may depend on a number of factors, including environment data such as a weather forecast. For example, the process 400 may be repeated on an hourly basis if a weather forecast predicts constant sunshine for a PV element's environment, but the process may be repeated at 20 second intervals if the weather forecast predicts partly cloudy skies. In some embodiments, the process 400 is repeated when an operating parameter of the PV element changes, or because of a change in an environment of the PV element.

At a block 410, the maximum power point tracker controls an operating parameter (e.g., a voltage set point) of the PV element at a voltage V, and it measures a first power of the PV element after a predetermined settling and averaging time. Because of the relationship between voltage and current in Ohm's law, at each step in the process 400 that the maximum power point tracker adjusts or calculates an operating parameter of the PV element, the maximum power point tracker may adjust either an operating voltage of the PV element or an operating current of the PV element (i.e., a current set point). Thus, throughout this disclosure, an operating current and an operating voltage are operating parameters that may be monitored, controlled, and adjusted. In some embodiments, the operating parameters are controlled and adjusted by controlling or adjusting an impedance related to the PV element.

At a block 420, the maximum power point tracker adjusts the operating parameter of the PV element to a voltage equal to $V-V_{dither}$. The maximum power point tracker then measures a second power of the PV element after a predetermined settling and averaging time. Dither voltage, $V_{dither}$, may be a function of a fill factor of the PV element, power, voltage, current, irradiance, temperature, time, location, or any other parameters related to the PV element. $V_{dither}$ may also vary depending on a type of solar cell used in the PV element. For example, a large $V_{dither}$ value may be used when a fill factor of a PV element is high, and a smaller $V_{dither}$ value may be used when a fill factor of a PV element is low. $V_{dither}$ may also be manually controlled. In other embodiments a variable dither voltage may be used to maximize energy harvest, increase a tracking speed of the maximum power point tracker, and improve stability of the maximum power point tracker. For example, if a PV element receives a constant irradiance, $V_{dither}$ may be reduced to a nominal value or to zero to avoid oscillating an operating power of the PV element around the PV element's maximum power point. In some embodiments, $V_{dither}$ is has a negative value, and the steps in the process 400 may be changed accordingly. In embodiments where the operating parameter is an operating current of a PV element, a dither current, $I_{dither}$, may be used instead of a dither voltage.

At a block 430, the maximum power point tracker adjusts the operating parameter of the PV element to voltage V. The maximum power point tracker then measures a third power of the PV element after a predetermined settling and averaging time. At a block 440, the maximum power point tracker adjusts the operating parameter of the PV element to a voltage equal to $V+V_{dither}$. The maximum power point tracker then measures a fourth power of the PV element after a predetermined settling and averaging time. In some embodiments, the value of $V_{dither}$ at block 440 is different from the value of $V_{dither}$ at block 420. At a block 450, the maximum power point tracker adjusts the operating parameter of the PV element to voltage V. The maximum power point tracker then measures a fifth power of the PV element after a predetermined settling and averaging time. In some embodiments, the maximum power point tracker measures a power of the PV element at a value of the operating parameter equal to $V-V_{dither}$ and $V+V_{dither}$ at blocks 410 and 450, respectively, and it measures a power of the PV element at a value of the operating parameter equal to V at blocks 430 and 450.

In some embodiments, the maximum power point tracker measures the power of the PV element at blocks 410-450 in equal time intervals. In other embodiments, the maximum power point tracker measures the power of the PV element at blocks 410-450 at varying time intervals. The duration of the time intervals between power measurements in blocks 410-450 may depend on numerous factors, including the operating power, voltage, or current of the PV element. Additionally or alternatively, the duration of the time intervals may depend on a PV element's historical or recent power output, irradiance, time, or other conditions.

At a block 460, the maximum power point tracker calculates an irradiance-rate-corrected slope of a power-voltage curve of the PV element. In embodiments that the power is measured at blocks 410-450 in equal time intervals and the value of $V_{dither}$ at block 420 is equal to the value of $V_{dither}$ at block 440, the irradiance-rate-corrected slope can be calculated using the following equation:

$$\frac{dP}{dV} = \frac{P_4 - P_2 - (P_5 - P_1)/2}{2 * V_{dither}} \quad (1)$$

where $P_4$ is the power calculated at block 440, $P_2$ is the power calculated at block 420, $P_5$ is the power calculated at block 450, $P_1$ is the power calculated at block 410, and $V_{dither}$ is the dither voltage of blocks 420 and 440. The process 400 may be central difference about a common time point, meaning that a time interval between measuring $P_1$ at block 410 and measuring $P_3$ at block 430 is equal to a time interval between measuring $P_3$ at block 430 and measuring $P_5$ at block 450, and a time interval between measuring $P_2$ at block 420 and measuring $P_3$ at block 430 is equal to a time interval between measuring $P_3$ at block 430 and measuring $P_4$ at block 440. In some embodiments, the process 400 may include more or fewer power measurements at varying operating parameters of the PV element. In such embodiments, the maximum power point tracker may still measure power of the PV element so that the power measurements are central different about a common time point. In some embodiments, such as when the value of $V_{dither}$ at block 420 is not equal to the value of $V_{dither}$ at block 440 or when time intervals between power measurements at blocks 410-450 are not equal, the irradiance-rate-corrected slope may be calculated using other equations. In some embodiments, the maximum power point tracker calculates a power-current curve of the PV element, and the maximum power point tracker calculates an irradiance-rate-corrected slope of the power-current curve.

At a block 470, the maximum power point tracker adjusts the operating parameter of the PV element. The operating parameter of the PV element may be adjusted by changing an impedance using a Newton or shooting method. The impedance is adjusted as a function of the irradiance-rate-corrected slope of the PV element's power-voltage curve. This is equivalent to adjusting the operating voltage of the PV element to a new nominal voltage V'. Nominal voltage V' may be calculated using various equations and/or conditional statements, including, for example, one or more of the following:

$$\text{if } \frac{dP}{dV} > 0, V' = V + V_{step1} * \left(1 + C_2 * \frac{(P_{max} - P_n)}{P_{max}}\right) * \frac{dP}{dV} \quad (2)$$
$$\text{else} \quad V' = V - V_{step2} * \left(1 + C_2 * \frac{(P_{max} - P_n)}{P_{max}}\right) * \frac{dP}{dV}$$

$$\text{if } \frac{dP}{dV} > 0, V' = V + V_{step3} * \left(1 + C_2 * \frac{(P_{max} - P_n)}{P_{max}}\right) \quad (3)$$
$$\text{else} \quad V' = V - V_{step4} * \left(1 + C_2 * \frac{(P_{max} - P_n)}{P_{max}}\right)$$

$$\text{if } \frac{dP}{dV} > 0, V' = V + V_{step5} \quad (4)$$
$$\text{else} \quad V' = V - V_{step6}$$

$$V' = V + C_1 - V_{step7} * \frac{dV}{dP} \quad (5)$$

where $C_1$ and $C_2$ are variables that may, for example, be used as a gain setting or a scale factor; $P_{max}$ is a maximum power of the PV element; $P_n$ is a current power output of the PV element at operating voltage V; and $V_{step1}$, $V_{step2}$, $V_{step3}$, $V_{step4}$, $V_{step5}$, $V_{step6}$, and $V_{step7}$ each a voltage "step size", affecting both the magnitude and direction that the PV element's operating voltage is adjusted. $V_{step1}$, $V_{step2}$, $V_{step3}$, $V_{step4}$, $V_{step5}$, $V_{step6}$, and $V_{step7}$ may be variables, and may be functions of power, voltage, irradiance, temperature, time, or any other parameter associated with the PV element. For example, $V_{step5}$ and $V_{step6}$ may vary according to an observed power change, weather data, or irradiance. After V' is calculated, it may be bounded to prevent the maximum power point tracker from generating a command that the PV element is incapable of achieving.

In some embodiments, the process 400 further includes an optional step of receiving environment data. Environment data may include a temperature, a barometric pressure, a weather forecast (including real-time forecasts and predictions based on weather conditions of a prior day), a radar or satellite image or video, a thermal image, a photograph or video, or any other data related to the PV element's environment. The maximum power point tracker may directly adjust or tune its method of determining a maximum power point of the PV element based on the environment data, or it may factor environmental data into the value of $V_{dither}$, $V_{step1}$, $V_{step2}$, $V_{step3}$, $V_{step4}$, $V_{step5}$, $V_{step6}$, or $V_{step7}$.

For example, environment data may include real-time cloud cover measurements or assessments that are related to a location of the PV element. Cameras mounted near the PV element may capture images of the sky, and the maximum power point tracker may process the images to produce parameters defining cloud cover, such as cloud spacing, cloud movement direction, cloud patterns (e.g., wispy, mottled, or solid), cloud optical density, and the like. The maximum power point tracker may account for these parameters by adjusting the value of $V_{dither}$, $V_{step1}$, and $V_{step2}$, or it may adjust the frequency at which the process 400 repeats itself, enabling the system to ignore temporary irradiance changes. As another example, environment data may include a weather forecast that the maximum power point tracker receives over a computer network, such as the internet. If the weather forecast predicts a cloudless sky, the maximum power point tracker may adjust $V_{dither}$, $V_{step1}$, and $V_{step2}$, or any other variable, accordingly.

In some embodiments, the maximum power point tracker starts operating at sunrise at a voltage equal to an open circuit voltage minus a delta value. The delta value is determined parametrically, and may depend on a type of solar cell composing a PV element, environment data, a design of the array, temperature, and other factors.

In some embodiments, the maximum power point tracker determines whether an irradiance of the PV element changes during the process 400. The maximum power point tracker may compare the power measured at block 430 with the power measured at block 410 and block 450. If the power measured at block 410 is different from the power measured at block 430, the maximum power point tracker may determine that irradiance of the PV element changed during the time period between block 410 and block 430. Similarly, if the power measured at block 450 is different from the power measured at block 430, the maximum power point tracker may determine that the irradiance of the PV element changed during the time period between block 430 and block 450. Consequently, the maximum power point tracker may adjust $V_{step1}$, $V_{step2}$, $V_{step3}$, $V_{step4}$, $V_{step5}$, $V_{step6}$, and $V_{step7}$ as necessary to account for changes in irradiance.

In some embodiments, the maximum power point tracker may adjust the parameters used to calculate an operating voltage of a PV element depending on the PV element's composition. For example, a maximum power point tracker may vary parameters used to calculate an operating voltage for a PV element composed of crystalline solar cells from those parameters that are used to calculate an operating voltage for a PV element composed of thin-film solar cells.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of setting an operating parameter of a photovoltaic element using a maximum power point tracker having a processor and a memory, the method comprising:
   measuring a first power of a photovoltaic element at a first value of an operating parameter of the photovoltaic element;
   measuring a second power of the photovoltaic element at a second value of the operating parameter of the photovoltaic element, wherein the difference between the first and second values of the operating parameter defines a first dither value;
   measuring a third power of the photovoltaic element at the first value of the operating parameter of the photovoltaic element;
   measuring a fourth power of the photovoltaic element at a third value of the operating parameter of the photovoltaic element, the third value of the operating parameter being different from the second value of the operating parameter of the photovoltaic element, the difference between the first and third values of the operating parameter of the photovoltaic element being equal to a second dither value;
   measuring a fifth power of the photovoltaic element at the first value of the operating parameter of the photovoltaic element;
   calculating a slope of a power-operating parameter curve of the photovoltaic element using the first power of the photovoltaic element, the second power of the photovoltaic element, the fourth power of the photovoltaic element, the fifth power of the photovoltaic element, and the first dither value and the second dither value;
   calculating a new value of the operating parameter of the photovoltaic element, wherein the new value of the operating parameter is based at least in part on the first value of the operating parameter and the slope of the power-operating parameter curve of the photovoltaic element; and
   adjusting a value of the operating parameter of the photovoltaic element so that the value of the operating parameter of the photovoltaic element is equal to the new value of the operating parameter.

2. The method of claim 1, wherein the operating parameter of the photovoltaic element is a voltage.

3. The method of claim 1, wherein the operating parameter of the photovoltaic element is a current.

4. The method of claim 1, wherein the first dither value and the second dither value are equal.

5. The method of claim 1, wherein the new value of the operating parameter is based at least in part on a change in irradiance on the photovoltaic element, and wherein the change in irradiance is determined by comparing the third power of the photovoltaic element with at least one of the first power of the photovoltaic element and the fifth power of the photovoltaic element.

6. The method of claim 1, further comprising receiving environment data, wherein the new value of the operating parameter of the photovoltaic element is based at least in part on the environment data.

7. The method of claim 6, wherein the environment data includes at least one of an image of the sky, a video of the sky, and a weather forecast.

8. The method of claim 1, wherein the difference between the value of the new operating parameter and the first value of the operating parameter depends at least in part on a value of the operating power of the photovoltaic element when the new value of the operating parameter is calculated.

9. The method of claim 1, wherein the value of the operating parameter of the photovoltaic element is adjusted by changing an impedance of an inverter connected to the photovoltaic element.

10. The method of claim 1, wherein the first dither value and the second dither value are variables that are based at least in part on at least one of fill factor, a type of solar cell composing the photovoltaic element, power, voltage, irradiance, and temperature.

11. The method of claim 1, wherein the first power of the photovoltaic element, the second power of the photovoltaic element, the third power of the photovoltaic element, the fourth power of the photovoltaic element, and the fifth power of the photovoltaic element are each measured after an equal time interval, wherein a value of the equal time interval is based at least in part on at least one of power, voltage, irradiance, and temperature.

12. The method of claim 1, wherein the first value of the operating parameter of the photovoltaic element is equal to a value of an open circuit voltage of the photovoltaic element minus a delta value.

13. A maximum power point tracking system for maximizing a photovoltaic element's output power, the system comprising:
   a maximum power point tracking component, the maximum power point tracking component configured to:
      measure a first power of a photovoltaic element at a first value of an operating parameter of the photovoltaic element;
      measure a second power of the photovoltaic element at a second value of the operating parameter of the photovoltaic element, wherein the difference between the first and second values of the operating parameter defines a first dither value;
      measure a third power of the photovoltaic element at the first value of the operating parameter of the photovoltaic element;
      measure a fourth power of the photovoltaic element at a third value of the operating parameter of the photovoltaic element, the third value of the operating parameter being different from the second value of the operating parameter of the photovoltaic element, the difference between the first and third values of the operating parameter of the photovoltaic element being equal to a second dither value;
      measure a fifth power of the photovoltaic element at the first value of the operating parameter of the photovoltaic element;
      calculate a slope of a power-operating parameter curve of the photovoltaic element using the first power of the photovoltaic element, the second power of the photovoltaic element, the fourth power of the photovoltaic element, the fifth power of the photovoltaic element, and the first dither value and the second dither value;
      calculate a new value of the operating parameter of the photovoltaic element, wherein the new value of the operating parameter is based at least in part on the first value of the operating parameter and the slope of the power-operating parameter curve of the photovoltaic element; and a photovoltaic element control component that controls an operating parameter of the photovoltaic element, the photovoltaic element control component configured to adjust a value of the operating parameter of the photovoltaic element so that the value of the operating parameter of the photovoltaic element is equal to the new value of the operating parameter.

14. The method of claim 13, wherein the operating parameter of the photovoltaic element is a voltage.

15. The method of claim 13, wherein the operating parameter of the photovoltaic element is a current.

16. The method of claim 13, wherein the first dither value and the second dither value are equal.

17. The system of claim 13, wherein the new value of the operating parameter is based at least in part on a change in irradiance on the photovoltaic element, and wherein the change in irradiance is determined by comparing the third power of the photovoltaic element with at least one of the first power of the photovoltaic element and the fifth power of the photovoltaic element.

18. The system of claim 13, further comprising an environment sensing component, the environment sensing component configured to produce or receive environment data relating to the photovoltaic element, wherein the new value of the operating parameter of the photovoltaic element is based at least in part on the environment data.

19. The method of claim 18, wherein the environment data includes at least one of an image of the sky, a video of the sky, and a weather forecast.

20. The method of claim 13, wherein the difference between the new value of the operating parameter and the first value of the operating parameter depends at least in part on an operating power of the photovoltaic element when the new value of the operating parameter is calculated.

21. The method of claim 13, wherein the photovoltaic element control component is an inverter, and wherein the value of the operating parameter of the photovoltaic element is adjusted by changing an impedance of the inverter.

22. The method of claim 13, wherein the first dither value and the second dither value are variables that are based at least in part on at least one of fill factor, a type of solar cell composing the photovoltaic element, power, voltage, irradiance, and temperature.

23. The method of claim 13, wherein the first power of the photovoltaic element, the second power of the photovoltaic element, the third power of the photovoltaic element, the fourth power of the photovoltaic element, and the fifth power of the photovoltaic element are each measured after an equal time interval, wherein the equal time interval is based at least in part on at least one of power, voltage, irradiance, and temperature.

24. The method of claim 13, wherein the first value of the operating parameter of the photovoltaic element is equal to a value an open circuit voltage of the photovoltaic element minus a delta value.

25. A method of setting an operating parameter of a photovoltaic element using a maximum power point tracker having a processor and a memory, the method comprising:

measuring a first power of a photovoltaic element at a first value of an operating parameter of the photovoltaic element;

measuring a second power of the photovoltaic element at a second value of the operating parameter of the photovoltaic element, wherein the difference between the first and second values of the operating parameter defines a first dither value;

measuring a third power of the photovoltaic element at a third value of the operating parameter of the photovoltaic element, the third value of the operating parameter being different from the second value of the operating parameter of the photovoltaic element, the difference between the first and third values of the operating parameter of the photovoltaic element being equal to a second dither value;

measuring a fourth power of the photovoltaic element at the first value of the operating parameter of the photovoltaic element;

calculating a slope of a power-operating parameter curve of the photovoltaic element using the first power of the photovoltaic element, the second power of the photovoltaic element, the third power of the photovoltaic element, the fourth power of the photovoltaic element, and the first dither value and the second dither value;

calculating a new value of the operating parameter of the photovoltaic element, wherein the new value of the operating parameter is based at least in part on the first value of the operating parameter and the slope of the power-operating parameter curve of the photovoltaic element; and adjusting a value of the operating parameter of the photovoltaic element so that the value of the operating parameter of the photovoltaic element is equal to the new value of the operating parameter.

26. The method of claim 25, further comprising receiving environment data, wherein the new value of the operating parameter of the photovoltaic element is based at least in part on the environment data.

27. The method of claim 26, wherein the environment data includes at least one of an image of the sky, a video of the sky, and a weather forecast.

28. The method of claim 25, wherein a difference between the new value of the operating parameter and the first value of the operating parameter depends at least in part on an operating power of the photovoltaic element when the new value of the operating parameter is calculated.

29. The method of claim 25, wherein the operating parameter of the photovoltaic element is a voltage.

30. The method of claim 25, wherein the operating parameter of the photovoltaic element is a current.

31. The method of claim 25, wherein the first dither value is equal to the second dither value.

32. The method of claim 1, wherein measuring the third power of the photovoltaic element is completed at a central time difference between measuring the first power of the photovoltaic element and measuring the fifth power of the photovoltaic element, and wherein measuring the third power of the photovoltaic element is completed at a central time difference between measuring the second power of the photovoltaic element and measuring the fourth power of the photovoltaic element.

33. The method of claim 25, wherein the slope of the power-operating parameter curve is calculated using a first and second central difference representation of power change about a common time instance, wherein the first central difference representation of power change results from a calculated change in the operating parameter of the photovoltaic element, and wherein the second central difference representation of the power change results from a change in irradiance.

34. A method of setting an operating parameter of a photovoltaic element using a maximum power point tracker having a processor and a memory, the method comprising:

calculating a slope of a power-operating parameter curve of a photovoltaic element using a first and second central difference representation of power change about a common time instance, wherein the first central difference representation of power change results from a calculated change in the operating parameter of the photovoltaic element, and wherein the second central difference representation of the power change results from a change in irradiance on the photovoltaic element; and adjusting a value of the operating parameter of the photovoltaic element based at least in part on the slope of the power-operating parameter curve.

* * * * *